United States Patent [19]

Zaremsky et al.

[11] Patent Number: 4,579,380

[45] Date of Patent: Apr. 1, 1986

[54] SERVO ROBOT GRIPPER

[75] Inventors: Mark Zaremsky; Lee E. Weiss; Thomas A. Mutschler, all of Pittsburgh, Pa.

[73] Assignee: Carnegie-Mellon University, Pittsburgh, Pa.

[21] Appl. No.: 558,425

[22] Filed: Dec. 6, 1983

[51] Int. Cl.[4] .......................... B25J 15/08; B25J 19/02
[52] U.S. Cl. ................................ 294/119.1; 294/907; 901/33; 901/38; 901/46
[58] Field of Search ............... 294/67 BB, 86 R, 88, 294/103 R, DIG. 2, 86.4, 106, 119.1, 907; 269/240, 242, 244, 278–280, 283; 414/1, 4, 741; 901/31–36, 38, 39, 46, 47

[56] References Cited

U.S. PATENT DOCUMENTS

| 1,811,299 | 6/1931 | Brockhaus | 269/242 |
|---|---|---|---|
| 2,698,764 | 1/1955 | Holland | 294/67 BB |
| 2,959,445 | 11/1960 | Breslav | 294/86 R |
| 3,261,479 | 7/1966 | Baker et al. | 901/38 X |
| 3,449,008 | 6/1969 | Colechia | 901/34 X |
| 3,904,234 | 9/1975 | Hill et al. | 901/38 X |
| 4,423,998 | 1/1984 | Inaba et al. | 294/86 R X |
| 4,479,673 | 10/1984 | Inaba et al. | 294/86 R X |

FOREIGN PATENT DOCUMENTS

| 1175169 | 7/1964 | Fed. Rep. of Germany | 901/36 |
|---|---|---|---|
| 2835447 | 2/1980 | Fed. Rep. of Germany | 294/86 R |
| 138271 | 10/1979 | Japan | 294/67 BB |
| 766854 | 10/1980 | U.S.S.R. | 901/33 |
| 887157 | 12/1981 | U.S.S.R. | 901/38 |

OTHER PUBLICATIONS

IBM Technical Disclosure Bulletin, vol. 23, No. 11, Apr. 1981, "Linear Robotic Gripper" by Cummins et al.

*Primary Examiner*—Johnny D. Cherry
*Attorney, Agent, or Firm*—Buell, Ziesenheim, Beck & Alstadt

[57] ABSTRACT

A light weight servo controlled robot gripper is disclosed. A plastic body houses one or more threaded drive shafts which are powered by a direct current motor. Attached to the shafts are finger mounting blocks which support removable fingers and which can be driven both closer to and further away from a fixed point by the motor. Integral with at least one mounting block is a force transducer which monitors the load exerted on the finger through a pivot and lever action of a mounting bracket provided adjacent to the load cell. Since the transducer is in the block rather than the fingertip, fingers are readily interchangable without reinstrumentation. A limit switch, located above one of the finger mounting blocks, is used to determine coarse finger position, and an optical shaft encoder provides precise position information allowing the gripper to be utilized for a variety of position as well as force servoing tasks.

12 Claims, 7 Drawing Figures

SERVO ROBOT GRIPPER

BACKGROUND OF THE INVENTION

1. Field of the Invention

This invention relates to a new and improved servo controlled robot gripper. More specifically, a light weight, servo position and force controlled robot gripper is provided having interchangable fingers thereon to allow the gripper to be utilized for a variety of different tasks.

2. Description of the Prior Art

There are many known robot grippers, most of which have been designed for various industrial purposes. Those grippers are typically pneumatic or hydraulically controlled and tend to be quite bulky and are, therefore, not suitable for attachment to many of the new light weight robots. Additionally, those grippers are not suitable for applications which require precise force and position control. The use of light weight, electronically activated grippers is also known. However, in the past, it was often necessary for a completely new gripper to be designed each time the performance of a slightly different task was required. For example, a robot gripper designed to place resistors in an electrical circuit could not be readily adapted to grasp or place transistors. There is, therefore, a need for a light weight gripper which can be adapted to perform a variety of tasks and which can grasp a variety of objects having the same general size and weight. There is also a need for a highly controllable and accurate gripper which is easily programmable and can be readily interfaced with commercially available light weight robots.

SUMMARY OF THE INVENTION

A light weight servo controlled robot gripper having interchangable fingers thereon is provided. Weight reduction is achieved by utilizing durable, high-strength plastics for the gripper body and bearing surfaces. An electric motor provides a powering means for one or more threaded power screws which are mounted for rotation on the gripper body. Attached to each screw and further supported by linear bearings is a finger mounting block. Each block is mounted in a manner allowing radial motion thereof relative to a fixed point. The motor, by rotating the drive screws, moves the blocks in a straight line both toward and further away from the fixed point. Force servoing is accomplished by providing a force transducer integral with one or more mounting blocks for monitoring the load exerted on the finger through a pivot and lever action of a mounting bracket positioned adjacent to the force transducer. Since the transducer is in the block rather than the finger tip, fingers need not be instrumented and are readily interchangable. An optical shaft encoder provides precise position information for position servoing tasks and a limit switch, located above one of the finger mounting blocks, is used to identify a known marker pulse on the encoder and serves to protect the device from damage which might occur from moving the blocks beyond the positions for which the device is designed.

It is an object of the present invention to provide a robot gripper which is light weight and which can be easily adapted for mounting on commercially available robots.

It is another object of the present invention to provide a robot gripper which has gripper fingers which are interchangable allowing the gripper to be utilized for a variety of tasks.

It is yet another object of the invention to provide a gripper having a force sensitive load cell associated therewith to detect the force exerted on the fingers thereby providing force feedback capabilities.

It is still another object of the present invention to provide a gripper which allows for position feedback by incorporating a standard optical shaft encoder to detect the position of the fingers.

It is yet another object to provide a gripper which incorporates a limit switch for use in determining coarse finger position.

It is still another object of the invention to provide a gripper in which position and force settings can easily be programmed to meet various gripper task requirements.

These and other objects of the invention will be more fully understood from the following description of the invention on reference to the illustrations appended hereto.

DESCRIPTION OF THE PREFERRED EMBODIMENTS

Figure 1:
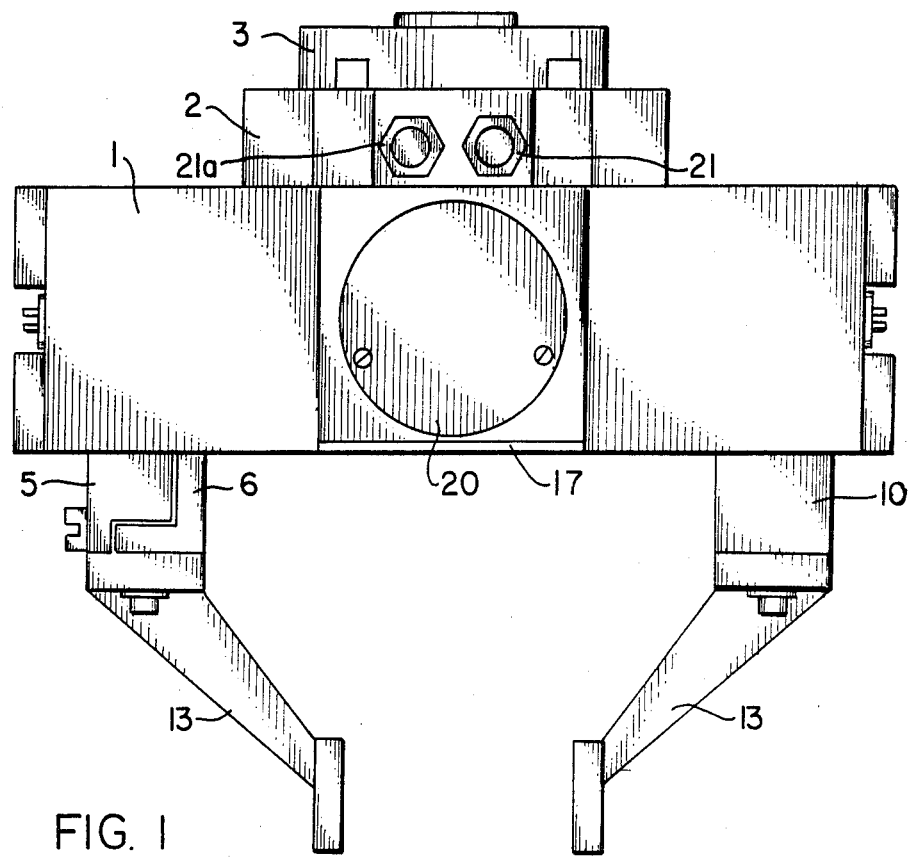
FIG. 1 is a front elevational view of a gripper according to the present invention.

Referring specifically to FIG. 1, a front elevational view of the robot gripper according to the present invention is shown. A gripper housing or body 1 is preferably fabricated from a durable high-strength plastic of the type sold under the trademark Delrin is provided. Body 1 has a length of approximately 5 ¾ inches and a height of approximately 1 11/16 inches. Attached above the body is a bus box 2 for use in connecting associated electrical circuits to the gripper. A mounting adaptor plate 3 is attached above the bus box 2 to provide a means to secure the gripper to a variety of commercially available robot arms. Bus box 2 and adapter plate 3 are also preferably fabricated from Delrin but may be made of any suitable material. Also shown, in FIG. 1 is a Delrin housing cover plate 17. Extending downwardly from body 1 are aluminum finger block 10, aluminum sensor block 5 and associated stainless steel loading bracket 6. Removably attached to finger block 10 and a loading bracket 6 are a pair of aluminum fingers 13 substantially as shown. A more detailed description of the finger mounting block arrangement will be discussed below. It is to be understood, however, that fingers having various other configurations can be provided on finger block 10 and bracket 6 for use in a variety of different tasks. A shaft encoder 20 is attached to the front of the housing 1 as shown. Shaft encoder 20 will also be discussed at greater length below.

Figure 2:
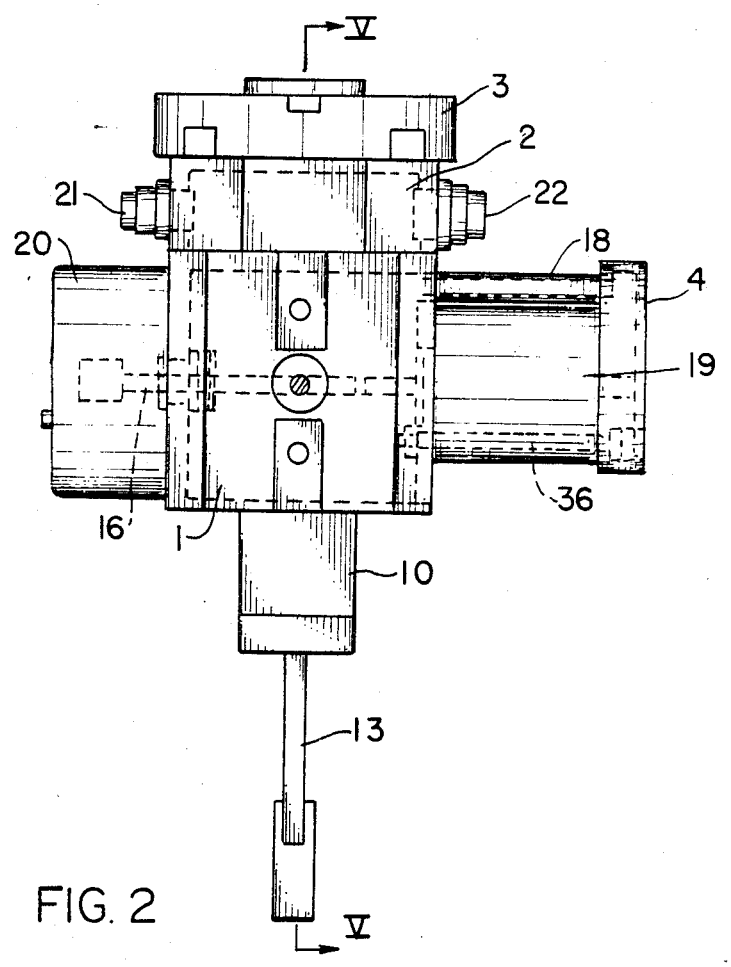
FIG. 2 is a side elevational view of the gripper shown in FIG. 1.

Referring now to FIG. 2, a side elevational view of the gripper is shown. A suitable direct current motor 19 and a motor cover 4 are attached to body 1 by motor mounting screw 36. A stainless steel tubing wire guide 18 is provided to protect the motor wiring. As mentioned above, finger mounting block 10 and detachable finger 13 extend from the lower portion of body 1. A suitable shaft encoder 20, such as a Litton No. 715-BZ-250-250-5-1, having an encoder shaft 16 associated therewith is attached to the front portion of housing 1. Bus box 2 and adapter plate 3 described above are shown as mounted to the top portion of body 1. Electrical connectors 21, 21a and 22 are shown extending from the front and rear portions of bus box 2.

Figure 3:
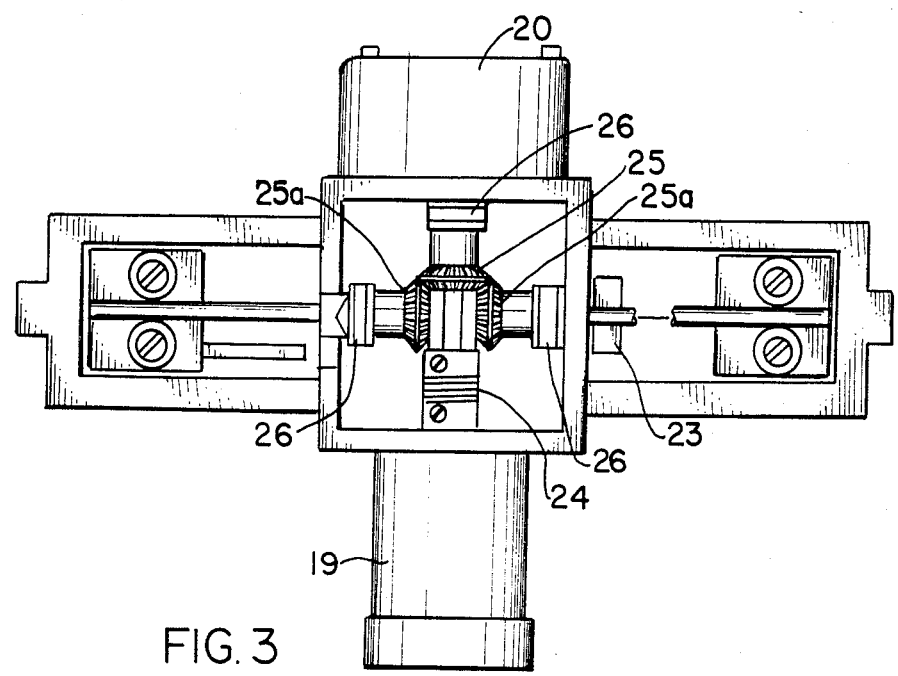
FIG. 3 is a bottom plan view of the gripper shown in FIGS. 1 and 2.

FIG. 3 shows a bottom plan view of the gripper with cover plate 4 removed. Motor 19 which has a motor drive shaft (not shown) extending therefrom, provides the power to move blocks 5 and 10 described above. The motor shaft is connected to a beveled pinion 25 through a flexible shaft coupling 24. Beveled pinion 25 is also attached to shaft encoder 20 thereby providing a means for the shaft encoder to monitor the rotational position of the motor drive shaft. Beveled pinion 25 operatively engages a pair of beveled gears 25a as shown for simultaneously rotating said gears in opposite directions. A precision thrust bearing 26 is provided adjacent to each beveled gear 25a and beveled pinion 25. An infra red sensor 23 is also provided.

Figure 4:
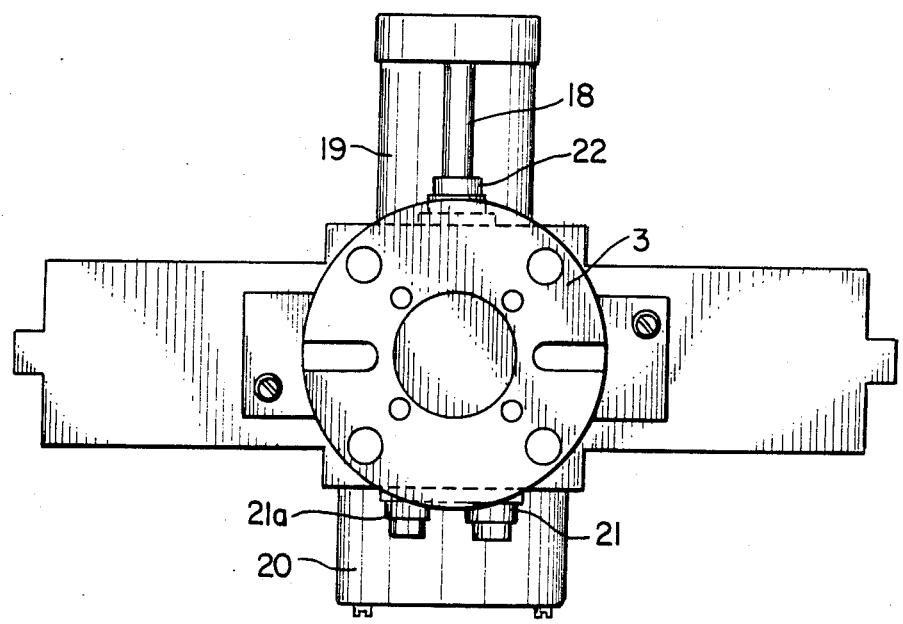
FIG. 4 is a top plan view of the gripper illustrated in the previous Figures having its top cover plate removed.

FIG. 4 is a top plan view of the gripper and illustrates the configuration of the mounting adapter plate 3. The relative positions of shaft encoder 20, motor 19 and associated motor cover 4 are also shown. As mentioned, motor wire guide 18, preferably fabricated from stainless steel tubing, is provided to isolate the motor wires from the gripper's internal mechanism.

Figure 5:
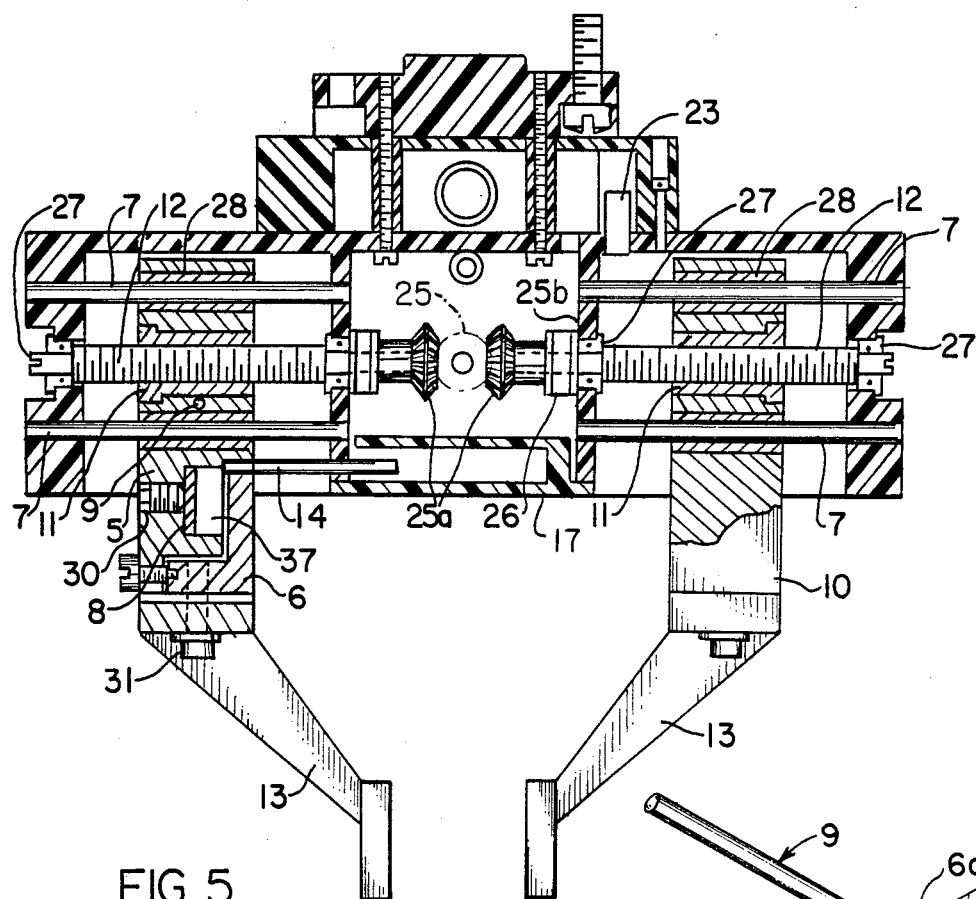
FIG. 5 is a cross sectional view taken through the plane V—V of FIG. 2.

Referring specifically to FIG. 5, a cross sectional view taken through the plane V—V of FIG. 2 is shown. FIG. 5 best illustrates the mechanical operation of the gripper. As the motor rotates beveled pinion 25, beveled gears 25a rotate in opposite directions. Gears 25a are attached to radilly extending drive shafts or power screws 12 which are mounting to body 1. As mentioned, precision thrust bearings 26 are provided to stablilize the drive shafts against the wall of gear box 25b. Suitable ball bearings 27 are provided at each end of each drive shaft 12 to allow the threaded shafts to rotate freely. Threaded drive shafts 12 are attached one to finger mounting block 10 and one to sensor mounting block 5 through teflon impregnated polycarbonate nuts 11 which function as low friction, self-lubricating bearings. Finger block 10 and sensor block 5 are each guided by a pair of stainless steel guide rods 7 as shown. Blocks 10 and 5 each have a pair of linear brass bushings 28 associated therewith which contact said steel guide rods 7 thereby allowing blocks 10 and 5 to move linearly either closer together or further apart in a controlled and accurate fashion.

An infra red sensor 23 is provided on body 1 so that as a finger mounting block passes in close proximity thereto, infra red radiation, produced by the sensor, is reflected off the mounting block and detected by the sensor thereby providing a means to calibrate the optical shaft encoder position sensing means.

Figure 6:
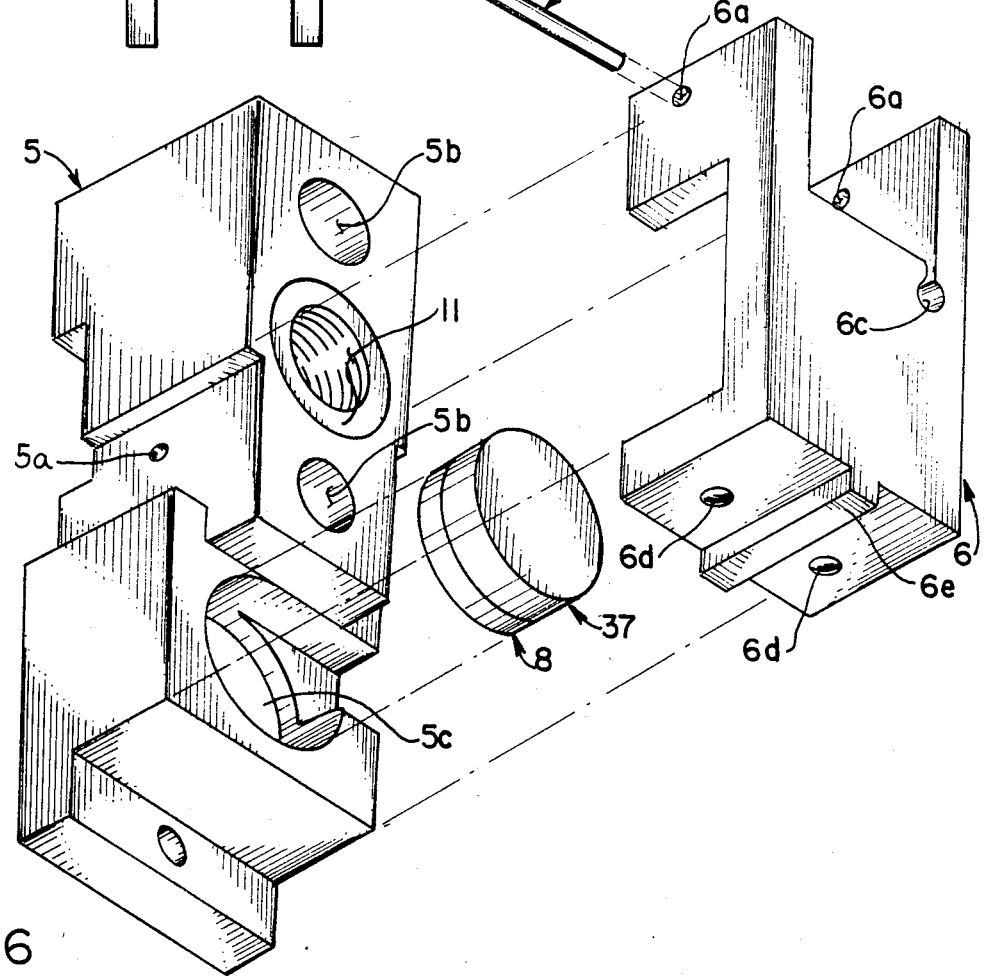
FIG. 6 is an isometric view in exploded form of a sensor block and sensor loading bracket utilized in the present invention.

Referring now to FIGS. 5 and 6, it can be seen that integral with sensor block 5, in recess 5c, is a force transducer 37 which measures a force related to the force applied to a finger along the finger's axis of closure. This is accomplished through a pivot and lever action of a finger mounting means or sensor load bracket 6 on load cell 37. The sensor load bracket 6 is attached to mounting sensor block 5 through pivot pin 9 which is encapable of transmitting a moment. Pin 9 passes through pivot pin hole 5a on sensor block 5 and holes 6a on bracket 6. The force at the tip of the finger is mechanically amplified through the lever and is transduced at the load cell. Load cell 37 is an Entran Model No. ELF-500-100 which can transduce a force of up to one hundred pounds. To increase the sensitivity of the gripper, the load cell, which is preferably removable, may be replaced with a cell of lower range, but the cell must have the same dimensions of the cell for which the gripper was designed. We prefer to provide a sensor block 5 which is machined from aluminum and a sensor loading bracket 6 which is machined from stainless steel. As best shown in FIG. 6, sensor block 5 has cylindrical bores 5b therein sized to receive brass bushings 28 and an additional bore for receiving drive shaft nut 11. A stainless steel backup disk 8 and associated set screw 30 (FIG. 5) provide a means for adjusting load cell 37 in the proper position to get an accurate reading of the force transmitted by the fingers. A finger may be easily mounted to bracket 6 by placing sensor finger screws 31 through said finger and into mounting screw holes 6d. The fingers are properly aligned by extending portion 6e of load bracket 6. Note that recess 5c of block 5 and bore 6c of bracket 6 cooperate to form a passageway for receiving load sensor wire guide 14. Mounting of a finger to block 10 may be similarly accomplished.

Figure 7:
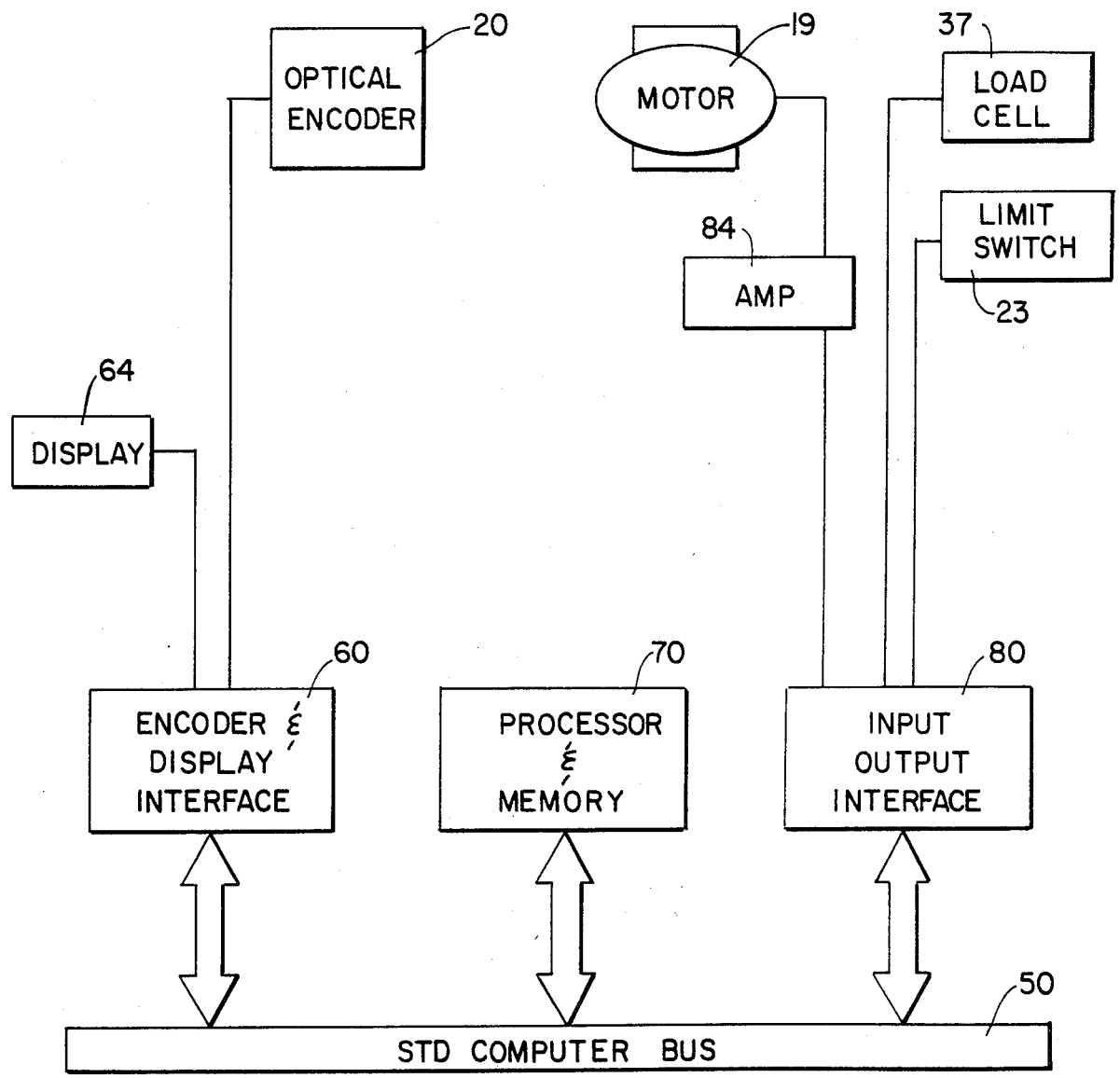
FIG. 7 is a block diagram showing the gripper controlling system.

Referrring specifically to FIG. 7, a block diagram illustrating the gripper control system is shown. The gripper's intelligence is provided by a micro-processor based controller. Major components of the controller communicate over an STD computer bus 50. Encoder/display board 60 attaches the incremental optical encoder 20 to the gripper and provides the processor 70 with positional information. It also drives a front panel position and force display 64. Input/output board 80 provides communication between the processor 70 and the gripper motor 19, amplifier 84, force transducer or load cell 37 and infra red limit switch 23. In addition, it provides digital communication paths to terminals and external host computers.

Since encoder 20 is an incremental type device, it is necessary to calibrate the gripper on power up. This is accomplished by applying a small positive voltage to motor 19 thereby moving the fingers slowly inward and monitoring the infra red limit switch 23 described above. Computer software is provided to monitor the analog signal provided by the infra red limit switch. As the finger passes under switch 23, the reflected light off the top of the finger block and the associated analog signal produced by said switch will increase until it crosses a preset software threshold. The position zeroing circuitry is then enabled so that upon encountering a first encoder marker pulse, the position counters will be set to zero. The processor then polls the market pulse bit. When this bit becomes set, the zeroing circuitry is disabled and the motor voltage is set to zero. The gripper is now calibrated and ready to be driven by the user supplied software.

Since the gripper contains transducers and a microprocessor controller, the user can write software to servo the gripper in either a position or force mode. In position mode, the controlling software, at discrete intervals, compares a desired position with the actual finger position, as provided by the shaft encoder. A compensated error signal, bufferred by an external user supplied DC amplifier, is computed and used to drive the motor. In force mode, the control scheme is similar except a force measurement, provided by the force transducer, is used instead of a positioned measurement. The gains used in computing the error signals in the two modes will, of course, be different.

A high level control language may easily be provided in order to make efficient use of these capabilities. Additionally, the gripper provides features which allow for sychronization to the outside world as well as simple interfacing to host computers.

It is to be understood that various modifications to the above-described embodiment of the invention are contemplated. For example, while we have described in detail a robot gripper having a pair of power screws thereon, it is contemplated that a larger number of power screws could extend radially outward from and be operatively connected to beveled pinion 25, thereby making possible the addition of additional mounting blocks and fingers on the device. Similarly, it is contemplated that for some applications a single power screw could be utilized to move a single finger in a straight line relative to a fixed point. In that case, any suitable stationary gripping surface could be provided on the body for the finger to grip against.

While I have shown and described certain present preferred embodiments of the invention, it is to be distinctly understood that the invention is not limited thereto and may be otherwise variously embodied within the scope of the following claims.

We claim:
1. A gripper for robots and the like comprising:
   (a) a body;
   (b) mounting block means attached to the body allowing radial motion thereof relative to a fixed point;
   (c) means for moving said mounting block means in a straight line towards and away from said fixed point;
   (d) a removable finger;
   (e) finger mounting means attaching the finger to the mounting block means; and
   (f) load sensing means associated with the mounting block means and finger mounting means to detect the relative magnitude of a load applied to the finger wherein said finger mounting means is a bracket pivotally mounted to said mounting block means for transmitting and mechanically amplifying a load applied on said finger to the load sensing means which is a force transducer positioned between said bracket and said mounting block means.

2. A gripper according to claim 1 wherein said load sensing means is removable.

3. A gripper for robots and the like comprising:
   (a) a body;
   (b) a motor attached to the body and having a rotatable motor drive shaft associated therewith;
   (c) coupling means attached to said motor drive shaft;
   (d) at least one threaded drive shaft mounted to the body for rotation, said threaded shaft extending radially outwardly from and operatively connected to said coupling means so that rotation of the motor drive shaft causes rotation of the threaded shaft;
   (e) mounting block means attached to each threaded drive shaft so that rotation of the motor drive shaft in one direction causes said mounting block means to move in a straight line toward a fixed point and rotation of the motor drive shaft in an opposite direction causes the block means to move in like manner away from said fixed point;
   (f) a removable finger attached to each finger mounting block means by suitable finger mounting means; and,
   (g) position sensing means attached to said body to detect the relative position of the fingers wherein said position sensing means is an incremental type shaft encoder attached to said body and having an encoder shaft associated therewith, said encoder shaft connected to said coupling means for rotation at a velocity responsive to the velocity of said motor shaft.

4. A gripper according to claim 3 wherein said position sensing means also has a calibrating means associated therewith comprising an infra red sensor positioned on said body so that when a finger mounting block means passes in close proximity thereto, infra red radiation provided by the sensor is reflected off said mounting block means and detected by said sensor.

5. A gripper according to claim 3 further comprising load sensing means associated with the mounting block means and finger mounting means to detect the relative magnitude of a load applied to the finger.

6. A gripper according to claim 5 wherein said load sensing means is removable.

7. A gripper for robots and the like comprising:
   (a) a body;
   (b) a pair of mounting blocks attached to the body allowing linear motion thereof along a single axis of closure;
   (c) means for moving said mounting blocks linearly towards each other and for moving said mounting blocks likewise further away from each other along said axis of closure;
   (d) a removable finger attached to each mounting block by suitable finger mounting means; and
   (e) load sensing means associated with at least one block of said pair of mounting blocks and with said finger mounting means to detect the relative magnitude of a load applied to a finger attached to said at least one mounting block along said axis of closure wherein said finger mounting means is a bracket pivotally mounted to said at least one mounting block for transmitting and mechanically amplifying a load applied on said finger to the load sensing means which is a pressure transducing load cell positioned between said bracket and said at least one mounting block.

8. A gripper according to claim 7 wherein said load sensing means is removable.

9. A gripper for robots and the like comprising:
   (a) a body;
   (b) a motor attached to the body and having a rotatable motor drive shaft associated therewith;
   (c) coupling means attached to said motor drive shaft;
   (d) a pair of threaded drive shafts mounted to the body for rotation, said threaded shafts extending in opposite directions from and operatively connected to said coupling means so that rotation of the motor drive shaft causes rotation of the threaded shafts in opposite directions;
   (e) a mounting block attached to each threaded drive shaft so that rotation of the motor drive shaft in one direction causes the mounting blocks to move linearly toward each other along an axis of closure and rotation of the motor drive shaft in an opposite direction causes the mounting blocks to move in like manner linearly away from each other;

(f) a removable finger attached to each mounting block by suitable finger mounting means; and (g) position sensing means attached to said body to detect the relative position of the fingers wherein said position sensing means is an incremental type shaft encoder attached to said body and having an encoder shaft associated therewith, said encoder shaft connected to said coupling means for rotation at a velocity responsive to the velocity of said motor shaft.

10. A gripper according to claim 9 wherein said position sensing means also has a calibrating means associated therewith comprising an infra red sensor positioned on said body so that when a finger mounting block passes in close proximity thereto, infra red radiation provided by the sensor is reflected off said mounting block and detected by said sensor.

11. A gripper according to claim 9 further comprising load sensing means associated with the mounting block means and finger mounting means to detect the relative magnitude of a load applied to the finger.

12. A gripper according to claim 11 wherein said load sensing means is removable.

* * * * *